United States Patent
Hergott et al.

(10) Patent No.: US 7,182,684 B2
(45) Date of Patent: Feb. 27, 2007

(54) METHOD AND MEANS FOR STUFFING NATURAL CASINGS WITH A SAUSAGE EMULSION

(75) Inventors: Steven P Hergott, West Des Moines, IA (US); David S Hamblin, Norwalk, IA (US); Michael J Hardy, West Des Moines, IA (US)

(73) Assignee: Stork Townsend Inc., Des Moines, IA (US)

( * ) Notice: Subject to any disclaimer, the term of this patent is extended or adjusted under 35 U.S.C. 154(b) by 50 days.

(21) Appl. No.: 10/659,650

(22) Filed: Sep. 10, 2003

(65) Prior Publication Data

US 2005/0059330 A1    Mar. 17, 2005

(51) Int. Cl.
A22C 11/00    (2006.01)
(52) U.S. Cl. ......................................................... 452/37
(58) Field of Classification Search ............ 452/30–35, 452/37, 46, 51; 42/30
See application file for complete search history.

(56) References Cited

U.S. PATENT DOCUMENTS

| | | | |
|---|---|---|---|
| 872,294 A * | 11/1907 | Hambruch | 452/37 |
| 990,547 A | 4/1911 | Gunuskey | |
| 1,038,912 A * | 9/1912 | Loerke | 452/123 |
| 1,395,967 A | 11/1921 | Merli et al. | |
| 1,486,476 A * | 3/1924 | Bloss | 452/37 |
| 2,568,491 A | 9/1951 | Edwards | |
| 3,122,779 A * | 3/1964 | Blcchschmidt | 452/33 |
| 3,150,410 A | 9/1964 | Washburn | |
| 3,195,176 A | 7/1965 | Washburn | |
| 3,253,297 A | 5/1966 | Nuckles | |
| 3,404,430 A | 10/1968 | Kielsmeier et al. | |
| 3,480,449 A | 11/1969 | Sumption | |
| 3,672,001 A | 6/1972 | Greider | |
| 3,724,030 A * | 4/1973 | Rassbach et al. | 452/45 |
| 3,731,346 A * | 5/1973 | Kupcikevicius | 452/31 |
| 3,805,329 A | 4/1974 | Kollross | |
| 3,805,480 A | 4/1974 | Cherio et al. | |
| 3,826,852 A | 7/1974 | Levaco et al. | |
| 3,860,996 A * | 1/1975 | Kupcikevicius et al. | 452/35 |
| 3,952,370 A | 4/1976 | Greider | |
| 3,964,128 A * | 6/1976 | Townsend et al. | 452/38 |
| 3,964,236 A | 6/1976 | Smith | |
| 4,112,546 A | 9/1978 | Muller | |
| 4,202,075 A | 5/1980 | Michel et al. | |
| RE30,390 E | 9/1980 | Kupcikevicius et al. | |

(Continued)

FOREIGN PATENT DOCUMENTS

DE        1136604        9/1962

(Continued)

Primary Examiner—Thomas Price

(57) ABSTRACT

A method of stuffing natural casings with emulsion involves placing a follower against an upstream end of the natural casing to slide the natural casing forwardly along a hollow meat stuffing tube. The follower is mounted on the stuffing tube and advances the natural casing towards a discharge end of the stuffing tube, where sausage emulsion is injected into the natural casing. The follower pushes the filled casing through a hollow conical-shaped restricting device adjacent the discharge end which limits the outer diameter of the filled natural casing to ensure the uniform shape of the casing as it enters the twisting mechanism. The follower is connected to a longitudinally movable shaft that is parallel to the stuffing tube. A machine includes the foregoing components to accomplish this method.

3 Claims, 2 Drawing Sheets

U.S. PATENT DOCUMENTS

| | | | |
|---|---|---|---|
| 4,257,146 A | 3/1981 | Karp | |
| 4,335,488 A * | 6/1982 | Becker | 452/33 |
| 4,417,368 A * | 11/1983 | Washburn | 452/34 |
| 4,419,790 A * | 12/1983 | Niedecker | 452/46 |
| 4,430,772 A * | 2/1984 | Michel et al. | 452/32 |
| 4,434,527 A | 3/1984 | Staudenrausch et al. | |
| 4,434,528 A * | 3/1984 | Niedecker | 452/37 |
| 4,437,209 A * | 3/1984 | Duroyon | 452/32 |
| 4,438,545 A | 3/1984 | Kupcikevicius et al. | |
| 4,447,933 A * | 5/1984 | Spiegelberg | 452/37 |
| 4,489,460 A | 12/1984 | Nausedas | |
| 4,525,895 A | 7/1985 | Raudys | |
| 4,570,300 A * | 2/1986 | Nausedas | 452/31 |
| 4,580,316 A | 4/1986 | Gunter | |
| 4,593,433 A | 6/1986 | Nausedas | |
| 4,642,848 A | 2/1987 | Kollross | |
| 4,649,602 A * | 3/1987 | Kupcikevicius | 452/38 |
| 4,670,942 A * | 6/1987 | Townsend | 452/37 |
| 4,683,617 A | 8/1987 | Raudys | |
| 4,768,261 A | 9/1988 | Nakamura | |
| 4,776,062 A * | 10/1988 | Bacon | 452/35 |
| 4,893,377 A | 1/1990 | Evans et al. | |
| 4,920,611 A * | 5/1990 | Townsend | 452/45 |
| 4,970,758 A | 11/1990 | Naples et al. | |
| 4,991,260 A | 2/1991 | Nausedas | |
| 5,046,219 A | 9/1991 | Stanley | |
| 5,067,313 A * | 11/1991 | Evans | 53/576 |
| 5,074,386 A * | 12/1991 | Evans | 188/67 |
| 5,083,970 A * | 1/1992 | Reutter | 452/30 |
| 5,092,814 A | 3/1992 | Kasai et al. | |
| 5,104,348 A * | 4/1992 | Powers et al. | 452/45 |
| 5,147,239 A | 9/1992 | Staudenrausch | |
| 5,152,712 A * | 10/1992 | Nausedas | 452/38 |
| 5,156,565 A * | 10/1992 | Jonnard | 452/32 |
| 5,197,914 A * | 3/1993 | Powers | 452/32 |
| 5,199,921 A * | 4/1993 | Townsend | 452/47 |
| 5,203,735 A * | 4/1993 | Stanek | 452/38 |
| 5,273,482 A | 12/1993 | Beckman et al. | |
| 5,297,983 A | 3/1994 | Mueller et al. | |
| 5,352,151 A * | 10/1994 | Piereder | 452/32 |
| 5,354,228 A | 10/1994 | Smith et al. | |
| 5,399,213 A | 3/1995 | Oxley | |
| 5,512,012 A * | 4/1996 | Lendle et al. | 452/35 |
| 5,743,792 A | 4/1998 | Hanten et al. | |
| 5,813,906 A | 9/1998 | Phillips | |
| 5,830,050 A | 11/1998 | Nakamura et al. | |
| 5,842,914 A | 12/1998 | Vermeer et al. | |
| 6,050,888 A | 4/2000 | Nakamura et al. | |
| 6,056,635 A | 5/2000 | Vermeer et al. | |
| 6,066,035 A | 5/2000 | Hergott et al. | |
| 6,066,036 A | 5/2000 | Carollo | |
| 6,117,003 A * | 9/2000 | Brinson | 452/31 |
| 6,139,416 A | 10/2000 | Toepfer | |
| 6,524,177 B2 * | 2/2003 | Bolzacchini | 452/22 |
| 6,558,241 B2 * | 5/2003 | Hergott et al. | 452/31 |
| 6,572,464 B1 | 6/2003 | Hergott et al. | |
| 6,585,580 B1 * | 7/2003 | Hergott et al. | 452/32 |
| 6,638,154 B1 * | 10/2003 | Misiewicz et al. | 452/35 |
| 6,659,853 B1 | 12/2003 | Hergott et al. | |
| 6,659,854 B1 | 12/2003 | Hergott et al. | |
| 6,669,545 B1 * | 12/2003 | Hergott et al. | 452/33 |

FOREIGN PATENT DOCUMENTS

| | | |
|---|---|---|
| DE | 3608777 C1 * | 3/1986 |
| DE | 4232759 | 3/1994 |
| DE | 29819328 U1 | 10/1998 |
| DE | 10001423 A1 | 1/2000 |
| EP | 0379123 | 7/1990 |
| FR | 2780246 | 12/1999 |

* cited by examiner

METHOD AND MEANS FOR STUFFING NATURAL CASINGS WITH A SAUSAGE EMULSION

BACKGROUND OF THE INVENTION

Traditionally, sausages have been made by filling the natural intestines of sheep or other animals with a sausage product whereupon the filled natural casing was formed into links for cooking. In more modern times, sausages are predominantly made by introducing an emulsion into an artificial casing, which encases the sausage material through linking and preliminary cooking. Machines for making sausages with artificial casings have a high volume capability (up to 30,000 sausages per hour). Efforts have been made to use these high-speed machines with natural casings. However, because of the nature of the natural casings including their relatively shorter and variable length and non-uniform diameter, modern sausage encasing machines have not achieved the volume and capacity with natural casings as they do with artificial casings.

U.S. Pat. No. 6,585,580 to Hergott et al. discloses a method and means for stuffing natural casings with sausage emulsion. Hergott et al. teaches the use of a slidable collar 28 that works in conjunction with a sensor 24A to position a natural casing 32 about the stuffing tube 14. As the natural casing 32 is stuffed with emulsion, collar 28 advances the natural casing 32 towards the twisting mechanism 16, which prepares the natural casing 32 for linking.

One disadvantage with conventional methods of stuffing natural casings with sausage emulsion, such as that taught by Hergott et al. above, is that the natural casing, as it is being stuffed with emulsion, does not easily advance towards the twisting mechanism. Typical methods will push the natural casing towards the twisting mechanism, which may cause the natural casing to become shirred as it approaches the twisting mechanism.

It is therefore a principal object of this invention to provide a method and a machine for encasing sausages whereby the natural casing is uniformly shaped when stuffed with the sausage emulsion.

A further object of this invention is to provide a method and a machine for encasing sausages whereby the natural casing is advanced on the stuffing tube by a follower mounted on the stuffing tube and moved longitudinally by a longitudinally moving shaft connected thereto.

These and other objects will be apparent to those skilled in the art.

BRIEF SUMMARY OF THE INVENTION

A method of stuffing natural casings with emulsion involves placing a follower against an upstream end of the natural casing to slide the natural casing forwardly along a hollow meat stuffing tube. The follower is mounted on the stuffing tube and advances the natural casing towards a discharge end of the stuffing tube, where sausage emulsion is injected into the natural casing. The follower pushes the filled casing through a hollow conical-shaped restricting device adjacent the discharge end which limits the outer diameter of the filled natural casing to ensure the uniform shape of the casing as it enters the twisting mechanism. The follower is connected to a longitudinally movable shaft that is parallel to the stuffing tube.

A machine includes the foregoing components to accomplish this method.

DESCRIPTION OF THE INVENTION

The term "emulsion" as used herein includes meat or any other edible substance.

Figure 1:
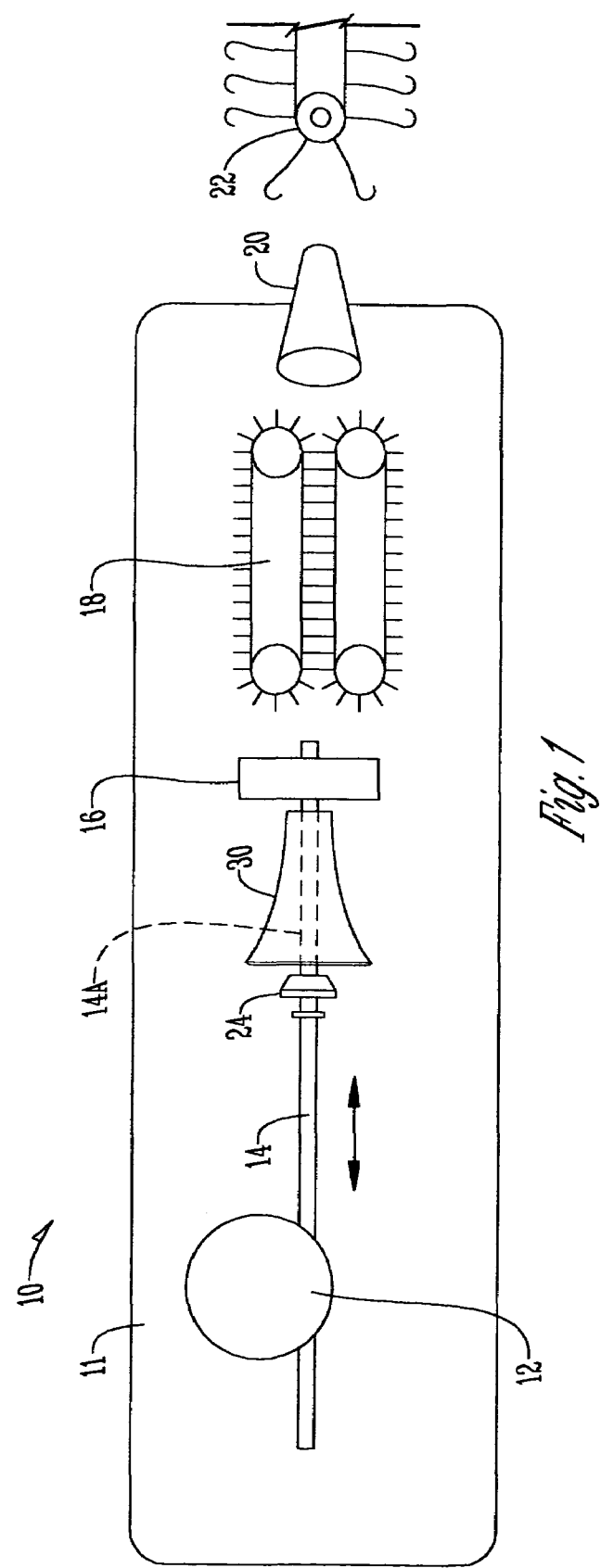
FIG. 1 is a plan view of a sausage making machine showing the conventional components, as modified by this invention.

With reference to FIG. 1, a conventional sausage making machine 10 has a frame 11, a pump 12 connected to a source of emulsion (not shown), a hollow meat stuffing tube 14 with discharge end 14A, a twisting mechanism 16, a linking mechanism 18, a discharge horn 20, and a conveyor 22.

Figure 2:
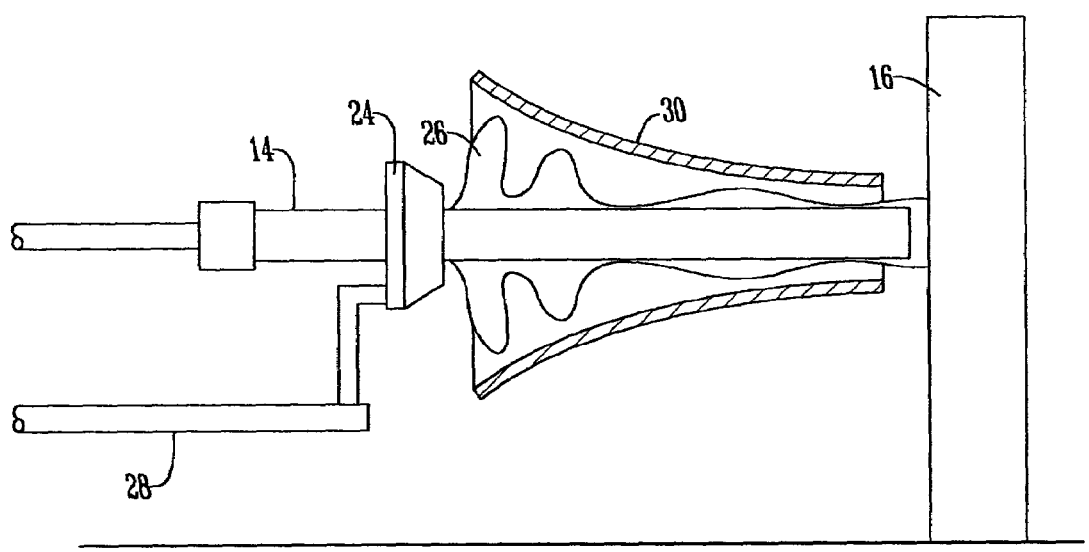
FIG. 2 is a partial side view of the present invention showing the forward end of the stuffing tube with the follower and the shape restricting device adjacent the twisting mechanism.

With reference to FIGS. 1 and 2, a follower 24 is shown to advance natural casing 26 about hollow meat stuffing tube 14. Follower 24 is slidably mounted about stuffing tube 14. A driving shaft 28 is attached to follower 24. Shaft 28 is driven by a servo motor (not shown) or similar devices as is common in the art.

A conical shaped restricting device 30 is mounted about the discharge end 14A of the stuffing tube 14. Conical shaped restrictor 30 an exterior side wall that extends from a smaller diameter end adjacent the discharge end 14A of the stuffing tube 14 to a larger diameter end to decrease the diameter of the natural casing 26 as it is being slidably moved towards the discharge end 14A of the stuffing tube 14 and through twisting mechanism 16. Restrictor 30 may be adapted to rotate about discharge end 14A as follower 24 pushes the natural casing 32 towards the twisting mechanism 16.

In operation, natural casing 26 is positioned about stuffing tube 14. Follower 24, driven by shaft 28, slides about stuffing tube 14 towards the discharge end 14A, thereby pushing the natural casing 26 towards the twisting mechanism 16. As natural casing 26 moves towards the twisting mechanism 16, it engages with conical shaped restricting device 30. Restrictor 30 limits the outer diameter of the natural casing 26 such that it is of a uniform diameter as it is filled with sausage emulsion and enters twisting mechanism 16. Follower 24 pushes the natural casing 26 through the restrictor 30 and advances it towards the twisting mechanism 16, where the natural casing 26 is linked in conjunction with linking mechanism 18.

It is therefore seen that by the use of a shape restricting device and a follower, this invention permits the smooth advancement of natural casings during the emulsion stuffing process to ensure the uniform shape of the casing as it is filled with sausage as it enters the twisting mechanism.

What is claimed is:

1. A method of advancing a natural casing along the length of a hollow meat stuffing tube, comprising, placing a hollow natural casing on the outside surface of a hollow stuffing tube having a meat emulsion discharge end, placing a follower against an upstream end of the natural casing to slide the natural casing forwardly along the stuffing tube towards a discharge end, placing a hollow conical shaped restrictor on the stuffing tube having a side wall extending from a smaller diameter end adjacent the discharge end of the stuffing tube to a larger diameter end, decreasing the diameter of the natural casing with the side wall of the conical shaped restrictor as the natural casing is being slidably moved towards the discharge end of the tube, and placing a twisting mechanism in spaced relation to and located downstream from the hollow conical shaped restrictor.

2. A machine for stuffing natural casings with emulsion, comprising, a hollow meat stuffing tube on the machine having a first end and a discharge end for extruding emulsion into a natural casing on an outer surface of the stuffing tube, a follower slidably mounted on the stuffing tube adjacent an end of the natural casing nearest the first end of the stuffing tube, a hollow conical shaped restrictor on the stuffing tube having a side wall with an exterior extending from a smaller diameter end adjacent the discharge end of the stuffing tube to a larger diameter end to decrease the diameter of the natural casing, and a twisting mechanism in spaced relation to and located downstream from the hollow conical shaped restrictor.

3. The machine of claim 2 further comprising, a longitudinally movable shaft that is parallel to the stuffing tube and connected to the follower and drives the follower longitudinally about the stuffing tube, thereby pushing the natural casing towards the discharge end of the stuffing tube as the casing is filled with emulsion.

* * * * *